(12) United States Patent
Miranowski et al.

(10) Patent No.: US 8,656,814 B2
(45) Date of Patent: Feb. 25, 2014

(54) ROTARY HUB FOR PULLEY SYSTEMS

(76) Inventors: James Miranowski, Kent, MN (US);
Paul G. Dimmer, Wahpeton, ND (US)

(*) Notice: Subject to any disclaimer, the term of this patent is extended or adjusted under 35 U.S.C. 154(b) by 481 days.

(21) Appl. No.: 12/895,810

(22) Filed: Sep. 30, 2010

(65) Prior Publication Data

US 2012/0082506 A1    Apr. 5, 2012

(51) Int. Cl.
*B25B 11/02*    (2006.01)
*B25B 13/48*    (2006.01)

(52) U.S. Cl.
USPC ............................. 81/484; 81/462; 81/176.2

(58) Field of Classification Search
USPC ........ 81/484, 180.1, 462, 488, 176.1, 176.15, 81/124.2, 176.2; 7/100
See application file for complete search history.

(56) References Cited

U.S. PATENT DOCUMENTS

| | | | | |
|---|---|---|---|---|
| 949,711 | A | * | 2/1910 | McLane ...................... 81/124.2 |
| 3,828,878 | A | * | 8/1974 | Clapsaddle, Jr. ............. 180/53.7 |
| 4,061,058 | A | * | 12/1977 | Douglas ..................... 81/176.15 |
| 4,171,653 | A | | 10/1979 | Holloway |
| 4,922,749 | A | | 5/1990 | Steffes |
| 5,123,314 | A | | 6/1992 | Wittmann |
| 5,882,181 | A | | 3/1999 | Genter |
| 6,640,670 | B2 | * | 11/2003 | Belcher ........................ 81/176.1 |

* cited by examiner

*Primary Examiner* — Hadi Shakeri
(74) *Attorney, Agent, or Firm* — Fredrikson & Byron, P.A.

(57) ABSTRACT

A rotary hub for being operatively coupled to a hub of a pulley to facilitate manual rotation of the pulley. The rotary hub involves an upper plate and a lower plate, with the upper plate operatively coupled to and offset from the lower plate. The lower plate is configured for being operatively coupled to the pulley hub. The upper plate has apertures defined about an outer ring thereof, with a plurality of the apertures configured for being engaged with in rotating the rotary hub.

15 Claims, 4 Drawing Sheets

ROTARY HUB FOR PULLEY SYSTEMS

BACKGROUND

1. Field of the Invention

The present invention relates to rotary hubs, and more particularly, to rotary hubs designed for being operatively mounted to pulleys of machines to facilitate manual rotation of such pulleys.

2. Description of the Related Prior Art

As is known in the farming industry, combines are drivable machines utilized by farmers to harvest grain crops. The combine is generally designed to complete three processes in each pass of the machine over a field. In particular, crops from the field are gathered in the front of the combine, after which, grain from the gathered crop is separated from the stems/leaves, and following such separation, the stems/leaves are either chopped and spread on the field or baled for feed and bedding for livestock. The processes of gathering the crops and of discharging the stems/leaves involve the use of motor-operated pulley systems of the combine.

One problem to date with combines is that their front (collecting) ends commonly become plugged from "slugs." A slug is generally the term used for crop parts that have gotten caught in the combine. Once these slugs become wedged in the combine front end, they are prevented from being passed through the combine. Consequently, this can have an adverse, and potentially catastrophic, effect on the motorized systems of the combine. In particular, the collected slugs can tie up the corresponding pulley systems at the combine front end, and unless the operator deactivates the combine and clears the front end, the tie up could potentially cause the combine motor to seize.

To that end, combines are often designed for dealing with clearing slugs from their front ends. In particular, the pulley system at the combine front end can be configured for being manually rotated in reverse so as to free the slugs or move the slugs outward so they can be removed from the front end. Such a system and technique are illustrated with respect to FIGS. 1 and 2. In particular, the front feed accelerator pulley (referenced as 10 in FIG. 1) of the combine can be manually backed out through use of a slug removal tool (referenced as 20 in FIG. 2). As can be appreciated from FIGS. 1 and 2, the slug removal tool 20 has three legs 22, 22', and 22" on a distal end 24 thereof which will align with three corresponding slots 12, 14, and 16 in the hub 18 of the front feed pulley 10. As such, in engaging the tool 20 with the pulley's hub 18, and then in manually rotating the tool 20 (which in turn rotates the hub 18), the front feed accelerator pulley 10 can be made to turn backward so as to free or loosen the slugs from the front end of the combine.

However, this same type of problem (with regard to collecting slugs) is also be found to occur at the back (or discharging) ends of combines. This problem has been found to be particularly troublesome when harvesting wet crops, as the stems of such crops are more apt to wrap around and become wedged in the combine rear end, thereby preventing such from being passed there through. Unfortunately, the pulley systems of the combine back ends have differed in design from their front end counterparts. In particular, the primary pulley and hub design is not equipped to be manually rotated backward via the slug removal tool 20 or other relative means so as to unplug the combine back ends from slugs wedged therein. Consequently, operators have been drawn to use other less effective methods of freeing the slugs from combine back ends.

The present invention addresses these limitations and those of other similar designs.

SUMMARY OF THE INVENTION

Embodiments of the present invention involve a rotary hub for being operatively coupled to a hub of a pulley to facilitate manual rotation of the pulley. The rotary hub involves an upper plate and a lower plate, with the upper plate operatively coupled to and offset from the lower plate. The lower plate is configured for being operatively coupled to the pulley hub. The upper plate has apertures defined about an outer ring thereof, with a plurality of the apertures configured for being engaged with in rotating the rotary hub.

DETAILED DESCRIPTION

Figure 1:
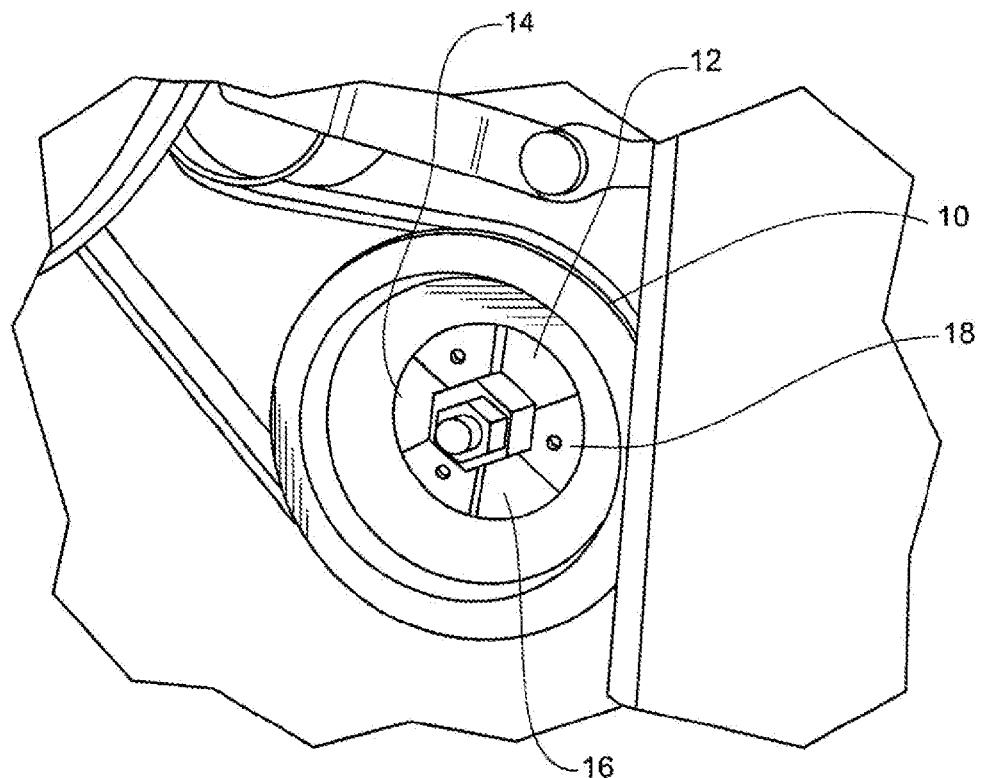
FIG. 1 is a side perspective view of a pulley of a front or collecting end of an exemplary harvesting combine.

The following detailed description should be read with reference to the drawings, in which like elements in different drawings are numbered identically. The drawings depict selected embodiments and are not intended to limit the scope of the invention. It will be understood that embodiments shown in the drawings and described below are merely for illustrative purposes, and are not intended to limit the scope of the invention as defined in the claims.

For example, while embodiments herein exemplify a rotary hub being used with a pulley on a harvesting combine, the hub could also be applied to pulleys similarly used with other drivable agricultural machines, such as bailers or cotton machines. To that end, the use of the term "pulley" herein should be understood to include any rotating structure that is driven via a circulating element, such as a belt, chain, etc. Furthermore, while the design parameters of the rotary hub are exemplified herein with respect to specific use on John Deere rotary combines (currently, the 50, 60, and 70 series combines), it should be appreciated that these dimensions can be modified as needed for using the rotary hub with harvesting combines of other manufacturers or with pulley systems of other drivable agricultural machines.

Regarding a harvesting combine, as described above, in the event its front or collecting end becomes tied up with slugs, the combine is often designed to enable the operator to manually back out the feed pulley at the front end to free the slugs so they can be removed. In certain cases, such a technique can involve using the above described slug removal tool 20

(shown in FIG. 2), which is configured to be engaged with the combine front end pulley 10 so when rotated, the slugs can be freed from the front end.

Unfortunately, as further described above, the problem of collecting slugs has also been found to occur at the back or discharging ends of combines. However, unlike their front end counterparts, the back end pulley systems are not configured for being easily rotated in reverse via manual efforts. This can be appreciated with reference to FIG. 3. As shown, the rear discharge hub 30 and pulley 32 are not configured to accept any rotating tool, such as the slug removal tool 20. There could be a variety of reasons for this. For example, the introduction of slots within the hub 30 for the pulley 32 (e.g., to mate with corresponding legs 22, 22', and 22" of the slug removal tool 20) may too greatly disrupt the structural integrity of the hub 30. Alternatively, the design of the hub 30 (with regard to its bolt spacing) may not allow for mating with such slug removal tool 20, even if desired. A further possibility is that combine designers did not contemplate slugs collecting and tying up the combine back end with any frequency, thus design of a mechanism for manual backing out the rear discharge pulley 32 was not necessary. Nevertheless, the problem has been found to occur with some frequency, especially in the harvesting of wet crops, and methods for addressing such problem are needed.

Figure 4:
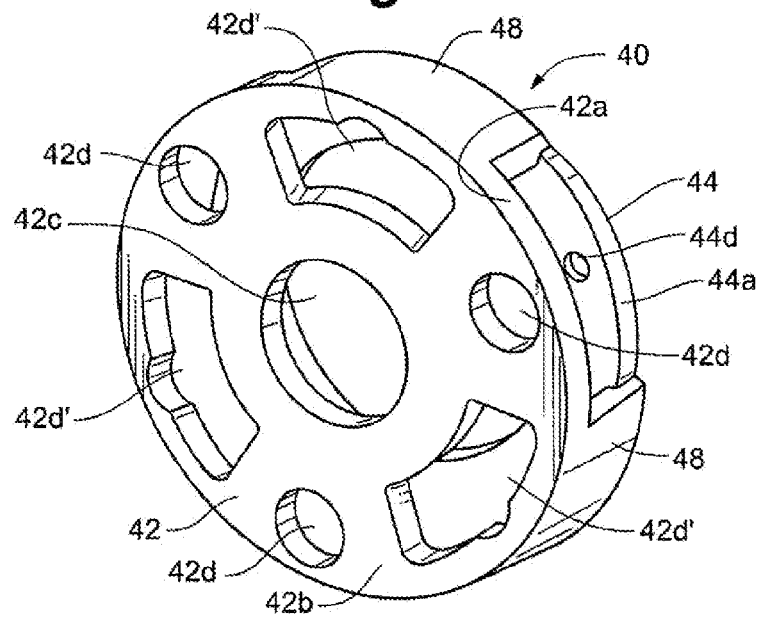
FIG. 4 is a top perspective view of a rotary hub usable for the combine discharging end of FIG. 3 in accordance with certain embodiments of the invention.
Figure 5:
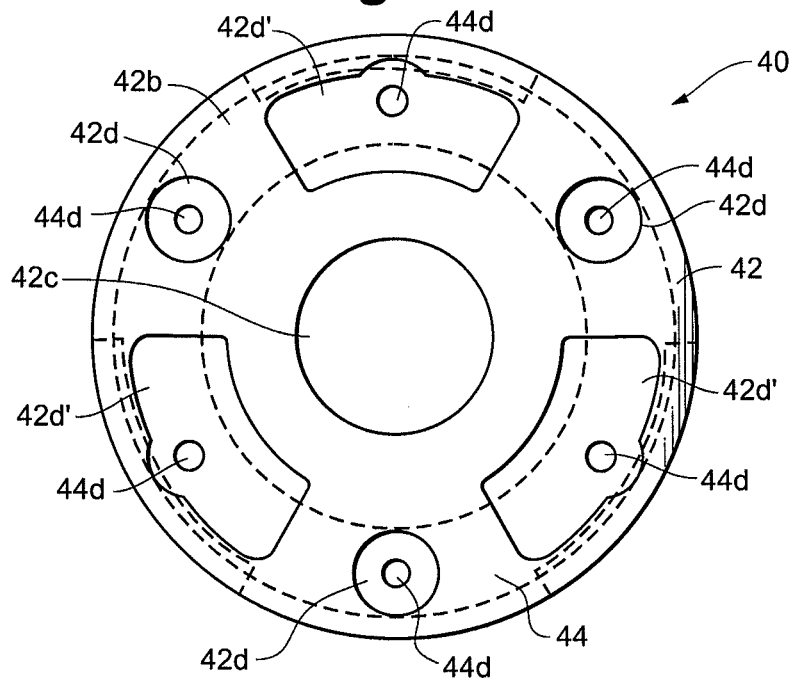
FIG. 5 is a top view of the rotary hub of FIG. 4.
Figure 6:
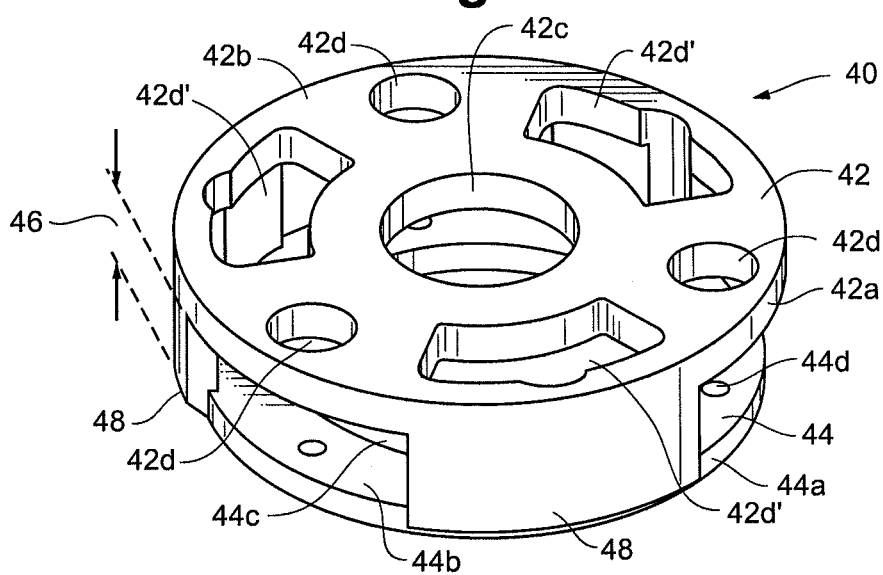
FIG. 6 is a side perspective view of the rotary hub of FIG. 4 in accordance with certain embodiments of the invention.

To that end, in certain embodiments of the present invention, a rotary hub 40 is used to address the problem. FIGS. 4-6 illustrate differing views of the hub 40. As shown, the rotary hub 40 is formed as an upper plate 42 being operatively joined to a lower plate 44. In certain embodiments, the plates 42, 44 are both circular. Additionally, in certain embodiments and as perhaps best shown with reference to FIGS. 5 and 6, the upper plate 42 can be of slightly greater size than that of the lower plate 44 (e.g., either in outer diameter or thickness, or both). For example, in certain embodiments, the outer diameter of the upper plate is about 7 inches, while the outer diameter of the lower plate is about 6.5 inches. Further, in certain embodiments, the thickness of the upper plate 42 is about 0.5 inches, while the thickness of the lower plate 44 is about 0.33 inches. However, it should be appreciated that the shapes and sizes of the plates 42, 44 can be altered as deemed appropriate. For example, one or both of the plates 42, 44 may be of a shape other than circular. Further, the upper plate 42 can be of slightly lesser size than that of the lower plate 44, or the plates 42, 44 can be of substantially similar sizes.

As shown, the plates 42, 44 are in parallel orientation with each other (i.e., one plate being directly over the top of the other plate), yet are offset from each other by a distance 46. To that end, in certain embodiments, the plates 42, 44 are operatively joined via a plurality of wall segments 48 distributed about, and extending there between, the outer edges 42a and 44a of the plates 42 and 44, respectively. Operatively joining the plates 42, 44 via the plurality of wall segments 48 limits the material used to form the rotary hub 40, thereby reducing its weight, while also allowing access to the area between the plates 42, 44 of the hub 40. Additionally, in certain embodiments, the rotary hub 40 is formed of steel; however, other materials or combinations of materials can be used so long as they withstand the forces applied to the hub 40 in its application, as further described herein.

Figure 3:
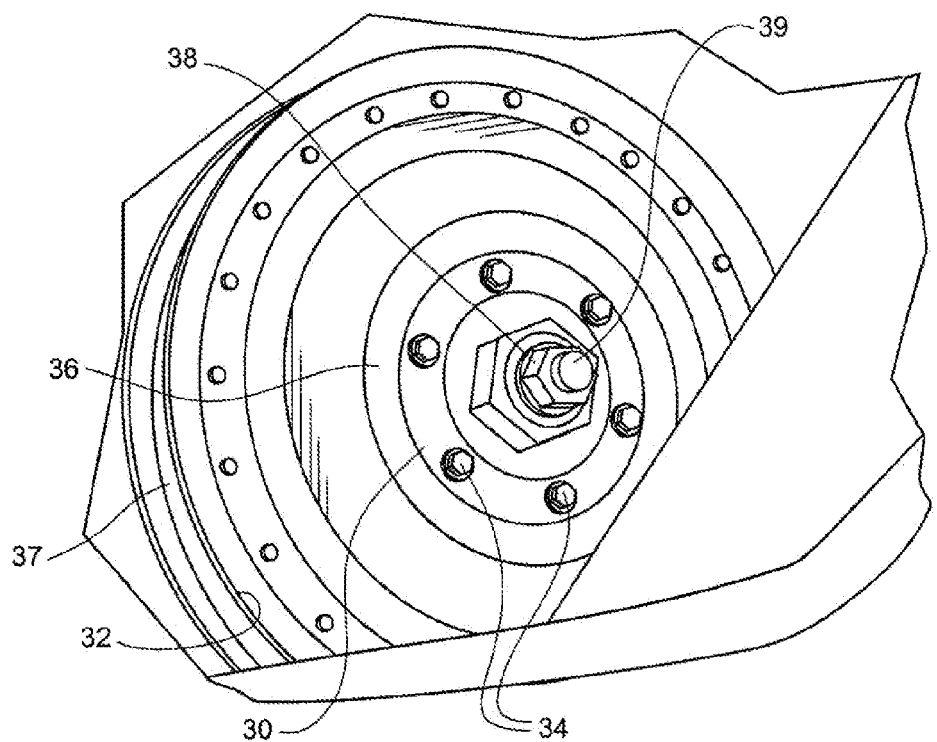
FIG. 3 is a side perspective view of a pulley of a back or discharging end of the same exemplary combine of FIG. 1.
Figure 7:
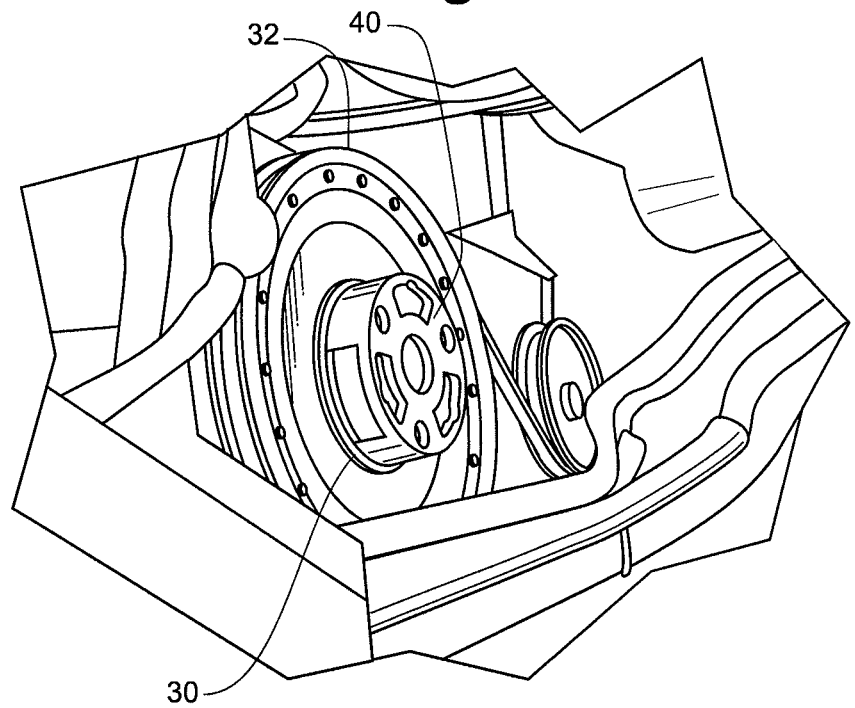
FIG. 7 is a photograph showing a side perspective view of the rotary hub of FIG. 4 assembled to the pulley of FIG. 3 in accordance with certain embodiments of the invention.

In certain embodiments, as illustrated in FIG. 7, the hub 40 can be configured for being affixed to the hub 30 of the rear discharge pulley 32 of a harvesting combine. With reference to FIG. 3, the opposing halves of the pulley 32 are held together by a plurality of factory-installed bolts 34 distributed about the periphery 36 of the hub 30, while the pulley 32 is held to the combine by a nut 38 that is secured on a threaded rod 39 protruding perpendicularly through the hub 30. A drive belt 37 is circulated between the opposing halves of the pulley 32.

In certain embodiments, the lower plate 44 of the rotary hub 40 is configured to be operatively mounted to the hub 30 of the rear discharge pulley 32 via a plurality of bolts 50 (not shown) that are used in place of the factory-installed bolts 34 of the pulley hub 30. As perhaps best shown with reference to FIG. 6, to enable direct mounting to the pulley hub 30, the lower plate 44 is configured to involve an outer ring 44b that defines a central bore 44c therein (for the threaded rod 39 and nut 38 securing the pulley 32 to pass through). The ring 44b, in certain embodiments, also defines a plurality of similarly-sized bores 44d therein that are spatially positioned about its circular extent so as to align with the positions of the factory-installed bolts 34 of the pulley hub 30. Consequently, to secure the rotary hub 40 in place, the factory-installed bolts 34 are replaced by the rotary hub bolts 50 (not shown), with the bolts 50 passing through the bores 44d of the rotary hub 40 and into the same holes of the pulley hub 30 configured for the factory-installed bolts 34. As such, each rotary hub bolt 50 needs to be longer than the factory-installed bolt 34 it replaces to account for additionally having to pass through the thickness of the lower plate 44. For reasons that will be realized from the further description herein, in certain embodiments, the rotary hub bolts 50 are also of stronger grade than the factory-installed bolts 34 they replace. As such, in certain embodiments, the rotary hub bolts 50 can be 8×30 mm, 10.9 grade metric steel bolts; however, the parameters of such bolts 50 can be altered as deemed appropriate.

As shown with reference to any of FIGS. 4-6, the upper plate 42 is configured to involve a ring 42b that defines a central bore 42c therein (for the threaded rod 39 and nut 38 securing the pulley 32 to pass through). In certain embodiments, the ring 42c of the upper plate 42 has a larger area than that of the ring 44b of the lower plate 44, which consequently results in the central bore 42c of the upper plate 42 having a smaller outer diameter than that of the central bore 44c of the lower plate 44. The ring 42b also further defines a plurality of spaced-apart apertures therein that correspondingly align with the bores 44d of the lower plate 44. Such apertures, in certain embodiments, involve a plurality of bores 42d and a plurality of slots 42d', with the bores and slots 42d, 42d' each sized to accept an end of a securing tool (e.g., a wrench with corresponding ratchet end) to pass there through. Consequently, while not shown, the end of such securing tool can be inserted into such bores and slots 42d, 42d' so as to tighten the rotary hub bolts 50 passing through the bores 44d of the lower plate 44 and into the pulley hub 30. Upon securing the lower plate 44 to the pulley hub 30 via the rotary hub bolts 50, the entirety of the rotary hub 40 is correspondingly secured to the hub 30.

As described above, in certain embodiments, the bores and slots 42d, 42d' are spaced about the upper plate ring 42b of the upper plate 42. Further, such bore and slots 42d, 42d' are sized such that a securing tool end can be passed there through for tightening the rotary hub bolts 50. However, in certain embodiments, the slots 42d' are also configured so as to be engaged with a tool for rotating the rotary hub 40, and in turn, the pulley 32 (secured to the rotary hub 40 via the pulley hub 30). In certain embodiments, the slots 42d' are equally spaced about the upper plate ring 42b of the upper plate.

Figure 2:
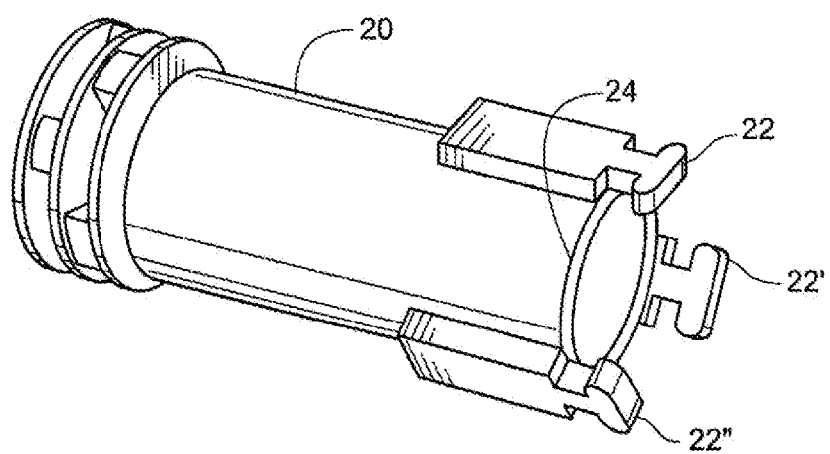
FIG. 2 is a side perspective view of an exemplary slug removal tool.

In certain embodiments, for example, the slots 42d' are sized and spaced about the upper plate ring 42b so as to be engaged with the slug removal tool 20 (shown in FIG. 2). In particular, the slots 42d' are corresponding defined in the upper plate 42 to align with the legs 22, 22', and 22" of the tool 20. Consequently, each of the legs 22, 22', and 22" can be inserted through corresponding slots 42d' and then locked therewith as the tool 20 is rotated. To provide clearance for the insertion and locking of the legs 22, 22', and 22" with the slots 42d', the upper plate 42 of the rotary hub 40 is offset from the lower plate 44, as described above.

Figure 8:
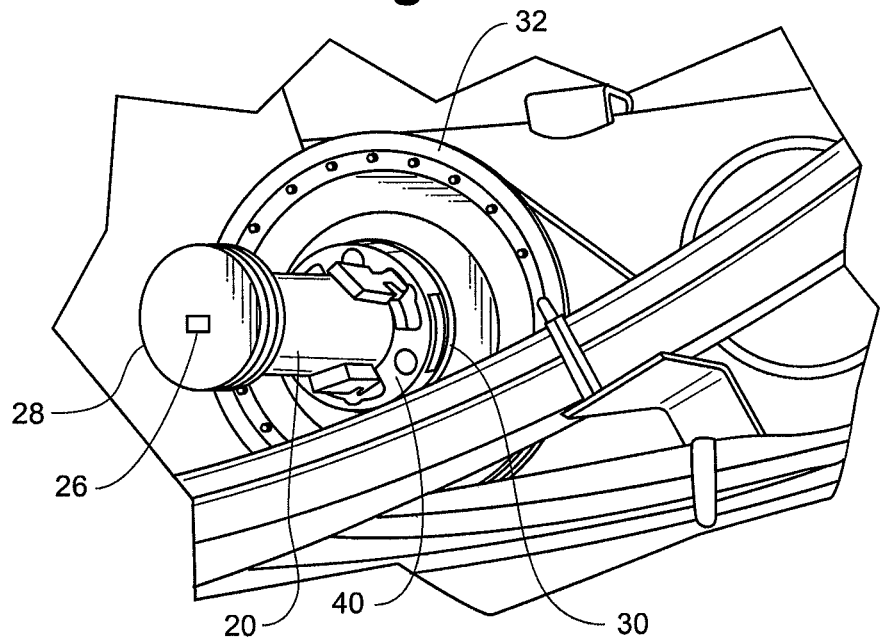
FIG. 8 is a photograph showing a side perspective view of the assembly of FIG. 7 with the slug removal tool of FIG. 2 linked thereto in accordance with certain embodiments of the invention.

In turn, the tool 20 can be engaged with the upper plate 42 of the rotary hub 40, as shown in FIG. 8. Consequently, the discharge hub 30 and pulley 32 of the combine can be manually backed out via use of the tool 20. As such, in engaging the tool 20 with the rotary hub 40, and then in manually rotating the tool 20 (which in turn rotates the hub 40), the discharge pulley 30 is corresponding rotated, and can be made to turn backward so as to free or loosen the slugs from the back end of the combine. In certain embodiments, as shown with further reference to FIG. 8, an insert 26 is defined on a proximal end 28 of the tool 20. Such insert 26 can be fitted with the end of a ratchet wrench to manually rotate the tool 20, which correspondingly rotates the rotary hub 40 and the pulley hub 30 secured thereto.

It should be appreciated that the rotary hub 40 provides certain advantages via its design. For example, as described above, each of the slots 42d' is defined along the outer periphery of the upper plate 42, i.e., spaced along the extent of the upper plate ring 42b. Consequently, through engagement of these slots 42d' with a rotating tool, such as the slug removal tool 20, the rotational or shear forces transferred onto the hub slots 42d' via rotation of the tool results in a more effective transfer of forces to the rotary hub 40 than if the force were transferred to a single area, e.g., a centralized area, of the hub 40. Likewise, such design results in less stress to the rotary hub 40 by dividing the rotating forces amongst the slots 42d' as opposed to transferring the rotating forces to the rotary hub 40 at a single area, e.g., a centralized area, of the hub 40.

In addition, by being able to utilize the same bolt positions of the factory-installed bolts 34 with longer and higher grade bolts 50, the designs of the discharge hub 30 and pulley 32 are largely unaffected, thereby keeping the part change out (in utilizing the rotary hub 40) relatively simple. Also, in designing the rotary hub 40 so that the discharge pulley 32 can be backed out using an extension tool, such as the slug removal tool 20, enables the shear or rotational force transferred to the hub 40 to be greater as opposed to not using an extension tool. This greater force is based on the tool acting as a lever, which generates the greater force. Due to this greater force, higher grade material can be desired for the rotary hub bolts 50, as described above. Further, in designing the rotary hub 40 so that a single extension tool, such as the slug removal tool 20, can be used to back out both the front and back pulleys 10, 32 alternately, the hub 40 is more conducive to machines using multiple pulleys that may need to be manually rotated, such as in harvesting combines.

It will be appreciated the embodiments of the present invention can take many forms. The true essence and spirit of these embodiments of the invention are defined in the appended claims, and it is not intended the embodiment of the invention presented herein should limit the scope thereof.

What is claimed is:

1. A rotary hub in combination with a belt pulley, wherein the hub is operatively coupled to a hub of the pulley to facilitate manual rotation of the pulley, the rotary hub comprising an upper plate and a lower plate, the upper plate operatively coupled to and offset from the lower plate, the lower plate being operatively coupled to the pulley hub, the upper plate having apertures defined about an outer ring thereof, a plurality of the apertures configured for being engaged with in rotating the rotary hub, wherein rotational forces applied to the upper plate via the plurality of apertures results in greater distribution of said forces and less stress on the rotary hub than a rotational force centralized at the upper plate.

2. The rotary hub and belt pulley combination of claim 1 wherein the pulley comprises a drive belt pulley.

3. The rotary hub and belt pulley combination of claim 1 wherein the pulley is part of a drivable agricultural machine.

4. The rotary hub and belt pulley combination of claim 3 wherein the drivable agricultural machine comprises a combine harvester.

5. The rotary hub and belt pulley combination of claim 1 wherein the plurality of apertures comprises slots spaced about the outer ring of the upper plate.

6. The rotary hub and belt pulley combination of claim 5 wherein the slots are equally spaced about the outer ring of the upper plate.

7. The rotary hub and belt pulley combination of claim 5 wherein the slots are configured for engaging a tool for rotating the rotary hub, wherein the upper plate is offset from the lower plate by a distance, wherein the distance enables adequate clearance space for engagement between the rotary hub and the tool.

8. The rotary hub and belt pulley combination of claim 1 wherein the upper and lower plates are operatively joined via a plurality of wall segments distributed about, and extending there between, outer edges of the upper and lower plates.

9. The rotary hub and belt pulley combination of claim 1 wherein the upper and lower plates are in parallel orientation with each other.

10. The rotary hub and belt pulley combination of claim 1 wherein the lower plate has a plurality of bores defined therein, wherein the plurality of bores are configured to align with corresponding bolts of the pulley hub.

11. A rotary hub in combination with a belt pulley, wherein the hub is operatively coupled to a hub of the pulley to facilitate manual rotation of the pulley, the rotary hub comprising an upper plate and a lower plate, the upper plate operatively coupled to and offset from the lower plate, the lower plate being operatively coupled to the pulley, the lower plate having a plurality of bores defined therein, the plurality of bores configured to align with corresponding bolts of the pulley hub, the upper plate having apertures defined about an outer ring thereof, a plurality of the apertures configured for being engaged with in rotating the rotary hub.

12. The rotary hub and belt pulley combination of claim 11 wherein the plurality of apertures comprises slots spaced about the outer ring of the upper plate.

13. The rotary hub and belt pulley combination of claim 12 wherein the slots are equally spaced about the outer ring of the upper plate.

14. The rotary hub and belt pulley combination of claim 12 wherein the slots are configured for engaging a tool for rotating the rotary hub, wherein the upper plate is offset from the lower plate by a distance, wherein the distance enables adequate clearance space for engagement between the rotary hub and the tool.

15. The rotary hub and belt pulley combination of claim 11 wherein the upper and lower plates are operatively joined via a plurality of wall segments distributed about, and extending there between, outer edges of the upper and lower plates.

* * * * *